United States Patent [19]
Hasenbeck

[11] 3,847,351
[45] Nov. 12, 1974

[54] SOIL MATRIC POTENTIAL SENSOR

[76] Inventor: Harold W. Hasenbeck, 1524 Almeda st., Pomona, Calif. 91767

[22] Filed: June 29, 1973

[21] Appl. No.: 374,865

[52] U.S. Cl. .................................. 239/63, 73/75
[51] Int. Cl. ............................................ A01g 25/00
[58] Field of Search ............. 239/63, 64, 75; 73/73, 73/75

[56] References Cited
UNITED STATES PATENTS

| | | | |
|---|---|---|---|
| 2,362,344 | 11/1944 | Bauer et al. | 73/75 |
| 2,718,141 | 9/1955 | Richards | 73/75 |
| 2,812,976 | 11/1957 | Hasenkamp | 239/63 |
| 3,430,486 | 3/1969 | Richards | 73/73 |
| 3,520,476 | 7/1970 | Schmid | 239/63 |
| 3,553,481 | 1/1971 | Hasenbeck | 239/63 |

Primary Examiner—M. Henson Wood, Jr.
Assistant Examiner—Michael Mar
Attorney, Agent, or Firm—William W. Haefliger

[57] ABSTRACT

A matric potential sensor comprises a heat diffusion sensor whose output varies as a function of changes in heat diffusion to and from the sensor, and porous granular material extending in adjacent, heat transfer relations with the sensor and capable of absorbing water when pressure in the surrounding soil is greater than the porous material about the sensor, and losing water content as the soil matric potential increases.

9 Claims, 4 Drawing Figures

PATENTED NOV 12 1974
3,847,351
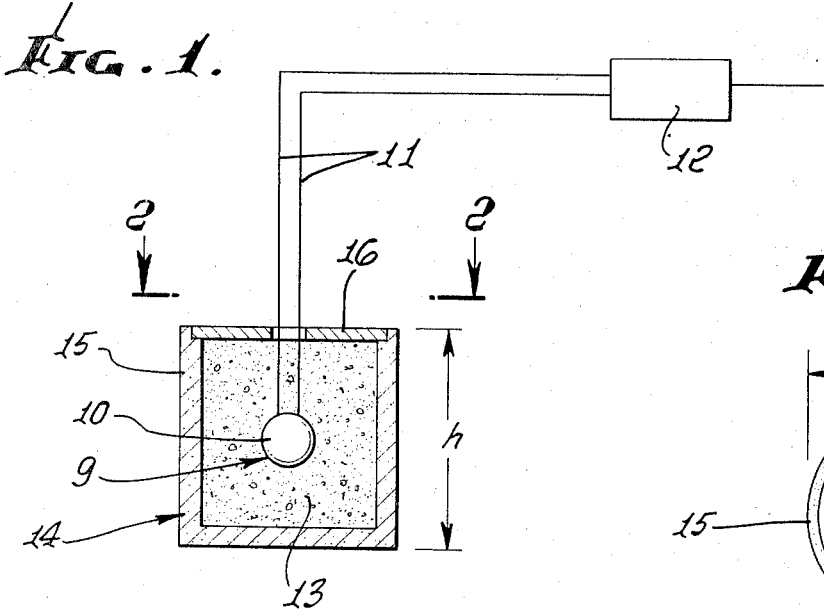
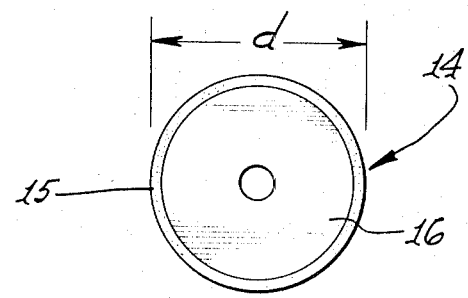
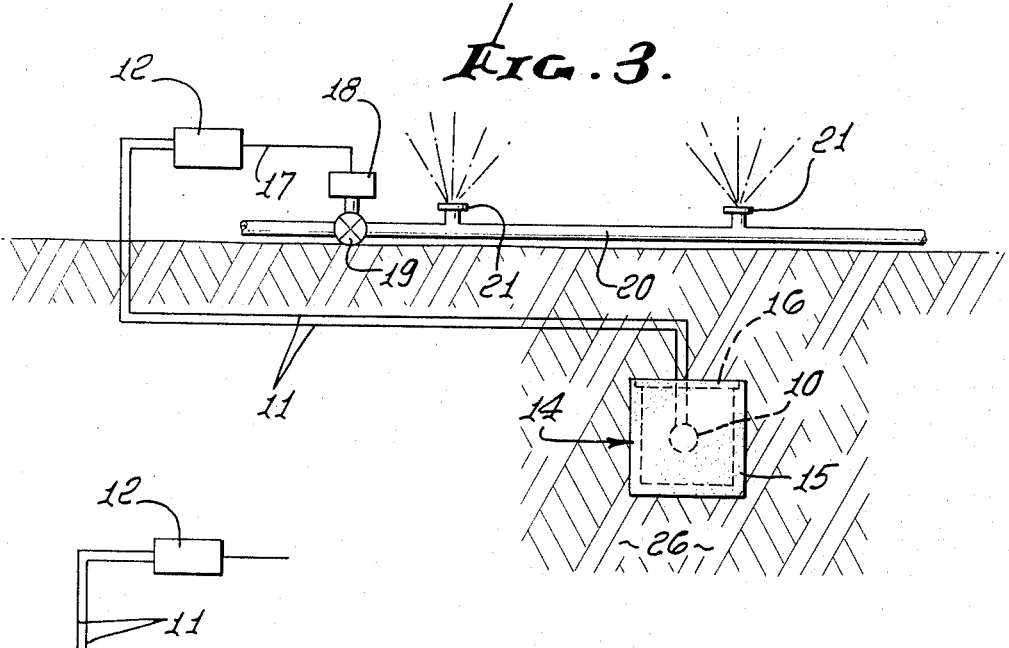
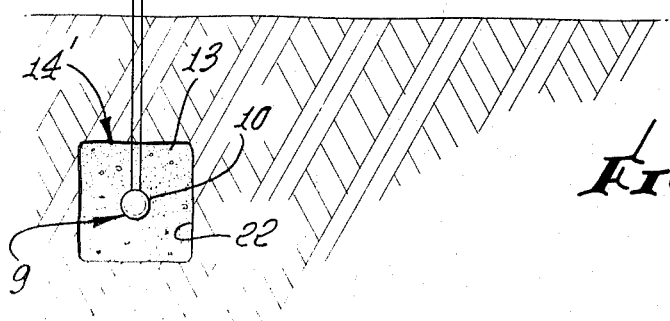

SOIL MATRIC POTENTIAL SENSOR

BACKGROUND OF THE INVENTION

This invention relates generally to irrigation control system, and more particularly concerns an improved system which is matric potential responsive.

Plant root systems retract moisture from the soil continuously during their lifetime. As water is depleted in the soil within and adjacent to the root system, voids appear in between the soil particles. Since adjacent undepleted moist soil forms a tight seal, the voids thus formed in the depleted area create a vacuum or suction, the degree of which depends upon the amount of water removed by the root systems. As the partial vacuum (matric potential) increases, it becomes increasingly difficult for the plant roots to extract the required moisture and transport it to the plant structure. As the plant stressing matric potential increases to a value of approximately −15 bars (−217.5 psi) the plant stress is so great that the plant can no longer survive.

It has been determined that plant growth and crop yield decrease as a function of the stress resulting from matric potential, the maximum yield occurring at matric potential values between −0.1 to −0.5 bars suction. However, because of the wide differences in the grain size and mix of various soils (e.g. fine sand versus clay), the amount of soil moisture that can be removed by the root system, for a given low matric potential, is quite large; i.e., in fine sand, roots can extract all but a few percent of the contained moisture without exceeding −0.5 bar suction. At the other end of the soil scale, the millimicron particles of clay have such a high capillary attraction for water that the matric potential may reach −0.5 bar suction even though the moisture in the clay is as high as 40 percent.

The wide difference in soil moisture content, as a function of plant root stress, is of great importance to proper design of sensors for controlling irrigation systems. It is found that unless a soil sensor is responsive to changes in matric potential, each soil type would require a separate sensor calibration; e.g. −0.5 bar suction in fine sand having 7 percent moisture, −0.5 suction in clay having 40 percent moisture. For this situation, sensors measuring resistance change as a function of soil moisture would require a 4 to 1 change in their calibration in order to control irrigation at −0.5 bars suction. The same holds true for heat-diffusion sensors since the heat transfer is a direct function of the soil moisture content.

Instruments for measuring matric potential have been available for a number of years. Their principle of measurement is based on the use of a sealed water column with a ceramic porous tip at one end. When the porous tip is placed in the soil to a given depth, water will flow through a porous tip into the soil until the suction which is developed at the top of the water column equals the soil matric potential. If a Bourdon tube is located within and at the top of the water column chamber, a mechanical linkage can be connected from the tube to a meter pointer. With this arrangement, the meter face may be calibrated to read the degree of matric potential of interest up to approximately −0.8 bar (limit due to out-gassing). After irrigation when the soil is wet to field capacity, the soil matric potential drops to a few millibars, the pressure differential between the soil and the water column forcing a flow of water from the soil through the porous tip into the water column. Flow will continue until the pressure is equalized. Since the instrument is not 100 percent efficient in recovering the water lost during periods of matric potential, water must be added to the column occasionally. Also, since they are damaged by freezing, they must be removed from the soil during the winter months. Electrical switch contacts can be added to the meter movement for use in turning irrigation "on" and "off" as a function of matric potential. This type of instrument is known as a tensionmeter.

SUMMARY OF THE INVENTION

It is a major object of the invention to overcome the disadvantages associated with prior devices and methods, as described above, through the provision of a matric potential sensor which may be of solid-state construction, and which is not only extremely sensitive to changes in matric potential but also requires no maintenance, has no moving parts and is not damaged by freezing.

Basically, the matric potential sensor comprises a heat diffusion sensor having an output which varies as a function of changes in heat diffusion from or to the sensor; and a porous granular material extending in adjacent, heat transfer relation with the heat diffusion sensor and characterized as capable of absorbing water when the pressure in the surrounding soil is greater than the porous material surrounding the heat-diffusion sensor and losing water content as the soil matric potential increases. The increase or decrease in the water content of the porous or granular material provides the changing heat transfer from the heat diffusion sensor. In one form of the invention, the granular material embedding the heat diffusion sensor is retained in a porous container and adapted to be placed underground in heat and water transfer relation with the surrounding soil; and in another form of the invention, the porous case is omitted, and the granular material embedding the sensor is located directly in an underground void.

Additional objects of the invention include the provision of granular material in the form of glass spheres, sand, or silica particles; and the operative connection of the matric potential sensor with an irrigation system via a valve control unit, as will appear.

These and other objects of the invention, as well as the details of illustrative embodiments, will be more fully understood from the following description and drawings, in which:

DRAWING DESCRIPTION

FIG. 1 is an elevation taken in section, showing one form of the invention.

FIG. 2 is a plan view taken on lines 2—2 of FIG. 1;

FIG. 3 is an elevation shwoing the FIG. 1 form of the invention installed in an irrigation system; and FIG. 4 is a view like FIG. 3 but showing another form of the invention.

DETAILED DESCRIPTION

In FIGS. 1 and 2, the matric potential sensor 9 comprises a heat diffusion sensor, as for example a thermistor 10 having leads 11 extending to a control unit 12. The latter may include a source of electrical potential, the amount of current passed to the sensor 9 and returned, and via leads 11, depending of course on the electrical resistance of the thermistor and which varies as a function of the rate of heat loss. Therefore, the output of the sensor 9 may be considered as varying as a function of changes in heat diffusion from (or to) the sensor.

Porous material extends in adjacent, heat transfer relation with the sensor 9, the material characterized as capable of absorbing water when matric potential of the surrounding soil is less than the porous material surrounding the sensor, and losing water content as the matric potential of the soil increases. Such material is indicated at 13 centrally embedding the sensor 9 and enclosed by a porous container 14 which comprises a receptable 15 and a cap 16. Container 14 may be cylindrical as seen in FIG. 2, and may have a height "$h$" approximately equal to its diameter "$d$", one example being $h = d = 1\frac{1}{2}$ inch.

Examples of granular material 13 include plaster sand, silica sand (60, 70, 120 and 200) and Palm Springs soil (sandy). Test show that such materials provide control of thermistor output at matric potentials ranging from 0.069 bar to −0.10 bar. In this regard, since plant growth is maximized when the matric potential is not allowed to exceed −0.5 to −0.1 bars, it is desirable to limit the matric potential to a low value, e.g. made to cycle between 0 and −0.3 bars by irrigating each time the matric potential reaches −0.3 bars. Granular material 13 may also, with unusual advantage, comprise synthetic particles such as glass spheres having cross dimensions (or diameters) ranging between 0.002 and 250 microns. The use of glass spheres enables close correlation of sphere size with matric potential range, the smaller the shpere diameter the higher the matric potential control range. A mono-matric potential sensor, that is capable of controlling irrigation at a specific matric potential, can be obtained by surrounding the sensor with granular material of a single or a narrow range of partical sizes; i.e., water is transferred from the granular particles to the soil at a specific value of matric potential.

Usable materials for the porous case or container include ceramic, gypsum, wire mesh, or any inert material which allows air entry and pass through at a lower pressure than the contained material surrounding the sensor. The pressure test for compliance of this requirement necessitates that each material must be completely wetted. The pressure that is required to force air through a given wet material is known as the "bubbling pressure."

Multi-range matric potential sensors can be obtained by mixing various granular particle sizes to surround sensor. The range of matric potential, to which a given sensor is responsive, is dependent upon the range of particle diameters mixed together; e.g. equal portions of glass spheres having diameters ranging from 250 microns to 1 micron provides an approximately linear change in sensor voltage from 0 to −0.7 bars. This type of matric potential sensor may be used in conjunction with valve control equipment to initiate irrigation at any point through the sensor measurement range. In addition this type sensor is useful for in situ measurements of changes in soil matric potential.

FIG. 3 shows sensor unit 14 located in situ in an underground formation 26, the leads 11 extending to a surface control unit 12 the output 17 of which is connected to an actuator 18 for irrigation control valve 19. For example, unit 12 may include a relay, actuated when the current passed by leads 11 changes to a predetermined vale, to thereby supply power to actuator 18 for opening valve 19. Water then flows in irrigation pipe 20 to sprinklers 21. Similarly, when the matric potential of the soil reduces sufficiently, as detected by sensor 14, valve 19 is closed.

FIG. 4 is the same as FIG. 3, except that the unit 14 does not include a porous case 15, but rather the void 22 in the soil is filled with material 13 in which thermistor 10 is embedded.

I claim:

1. In a matric potential sensor for use in underground soil and in combination with an automatic, closed-loop, irrigation control, the combination comprising
    a. a heat diffusion sensor in the form of a solid state, heat diffusion thermistor having an output which varies as a function of changes in heat diffusion from or to the sensor, and
    b. porous granular material in the form of glass beads extending in adjacent, heat transfer relation with the heat diffusion sensor and characterized as capable of absorbing water when pressure in the soil is greater than the porous material and losing water content as the matric potential of the soil increases, thereby providing the required increase or decrease in sensor heat-diffusion.

2. The combination of claim 1 including a porous container containing said material, and adapted to be located underground in heat and water transfer relation with the underground formation.

3. The combination of claim 2 wherein said heat diffusion sensor is embedded in the porous material which is located in the container.

4. The combination of claim 3 wherein the container is located in situ, underground.

5. The combination of claim 1 including said irrigation control operatively coupled with the sensor to initiate irrigation when the sensed matric potential increases above a predetermined level and deactivates irrigation when the soil matric potential reduces below the sensor initiation point.

6. The combination of claim 1 wherein said sensor is embedded in the porous material which is located in situ, underground.

7. The combination of claim 6 including said irrigation control operatively coupled with the sensor to initiate irrigation when the sensed matric potential increases above a predetermined level and deactivates irrigation when the soil matric potential reduces below the sensor initiation point.

8. The combination of claim 2 wherein said glass beads have cross dimensions between 0.002 and 250 microns to provide a matric potential control range of from −0.01 to −15 bars.

9. The combination with claim 6 wherein various sizes of porous material are mixed to form various linear matric potential sensors suitable for soil matric potential measurements over the measurement range or for irrigation control at selected values within the measurement range.

* * * * *